US011929227B1

(12) United States Patent
Park

(10) Patent No.: US 11,929,227 B1
(45) Date of Patent: Mar. 12, 2024

(54) MULTI-CONTACT DISCONNECT SWITCH FOR LIGHTNING ARRESTER

(71) Applicant: CHERYONG ELECTRIC CO., LTD., Seoul (KR)

(72) Inventor: Jong Tae Park, Seoul (KR)

(73) Assignee: CHERYONG ELECTRIC CO., LTD., Seoul (KR)

( * ) Notice: Subject to any disclaimer, the term of this patent is extended or adjusted under 35 U.S.C. 154(b) by 0 days.

(21) Appl. No.: 18/384,026

(22) Filed: Oct. 26, 2023

(30) Foreign Application Priority Data

Mar. 23, 2023 (KR) ........................ 10-2023-0037748

(51) Int. Cl.
*H01H 9/00* (2006.01)
*H01H 9/02* (2006.01)

(52) U.S. Cl.
CPC ............ *H01H 9/0066* (2013.01); *H01H 9/02* (2013.01)

(58) Field of Classification Search
CPC ........... H01H 2003/00; H01H 2003/02; H01H 2033/42; H01H 2033/426; H01H 2203/00; H01H 2203/01; H01H 2203/02; H01H 2203/022; H01H 69/00; H01H 79/00; H01H 39/004; H01H 83/10; H01H 9/00; H01H 9/0066; H01H 9/02; H01H 9/10; H01H 9/102; H01H 9/104; H01H 9/106; H01F 27/02; H01F 27/36; H01F 27/40; H01F 27/402; H01F 27/404; H01F 27/406; H01F 27/42; H01T 4/00; H01T 4/10; H01T 4/16; H02H 9/00; H02H 9/002; H02H 9/04; H02H 9/041; H02H 9/042; H02H 9/043; H02H 9/044; H02H 9/06
USPC .......................................................... 200/238
See application file for complete search history.

(56) References Cited

U.S. PATENT DOCUMENTS

| | | | | |
|---|---|---|---|---|
| 5,663,859 A | | 9/1997 | Knapp | |
| 9,324,533 B2 * | | 4/2016 | Horne | H01H 85/44 |
| 2011/0226740 A1 * | | 9/2011 | Anheuer | H01H 1/5833 218/140 |

FOREIGN PATENT DOCUMENTS

| | | | |
|---|---|---|---|
| JP | 2015-064967 | A | 4/2015 |
| KR | 10-1997-0071889 | A | 11/1997 |
| KR | 10-0260546 | B1 | 7/2000 |
| KR | 10-1026842 | B1 | 4/2011 |
| KR | 10-2015-0055706 | A | 5/2015 |
| KR | 10-2072330 | B1 | 3/2020 |
| KR | 10-2022-0167903 | A | 12/2022 |
| KR | 10-2510703 | B1 | 3/2023 |

* cited by examiner

*Primary Examiner* — Anthony R Jimenez
(74) *Attorney, Agent, or Firm* — The PL Law Group, PLLC

(57) ABSTRACT

The present invention relates to a multi-contact disconnect switch for a lightning arrester configured to maintain contact points of a contact shaft evenly and to improve the operation stability of the contact shaft, and more particularly to, a multi-contact disconnect switch for a lightning arrester including a first body having a passage formed therein and a multi-contact unit positioned on one side of the passage, and a second body having a contact shaft inserted into the passage and coupled to the other side of the first body, wherein, when the second body is coupled to the first body in a contact state, an end of the contact shaft is in contact with the multi-contact unit, and thus the multi-contact unit is in multi-contact with a contact circumferential surface of the contact shaft.

4 Claims, 4 Drawing Sheets

MULTI-CONTACT DISCONNECT SWITCH FOR LIGHTNING ARRESTER

CROSS-REFERENCE TO RELATED APPLICATION AND CLAIM OF PRIORITY

This application claims the benefit under 35 USC § 119 of Korean Patent Application No. 10-2023-0037748, filed on Mar. 23, 2023, in the Korean Intellectual Property Office, the entire disclosure of which is incorporated herein by reference for all purposes.

BACKGROUND

1. Technical Field

The present invention relates to a multi-contact disconnect switch for a lightning arrester, and more particularly, to a multi-contact disconnect switch for a lightning arrester configured to maintain contact points of a contact shaft evenly and to improve the operation stability of the contact shaft.

2. Background Art

A lightning arrester is a protective device that prevents insulation breakdown of power equipment or damage and shortening of life span of electrical and electronic equipment by limiting temporary overvoltage such as surge voltage caused by lightning strike or circuit opening and closing in power transmission and distribution, power plants, substations and catenary lines, transformers, and the like.

A disconnector is installed in the circuit of such a lightning arrester, and has a structure in which a lead wire of the lightning arrester is connected thereto.

Generally, a method of connecting the disconnector to the lightning arrestor is a method of inserting the lead wire under the disconnector and bolting the lead wire to discharge the current from the lightning arrester to the ground, i.e., a method of connecting the disconnector to the lightning arrestor by using a separate bracket made of copper (grounding part), wherein an upper part of the bracket is fixedly fastened to the disconnector with a screw, and a lower part of the bracket is fastened to the lead wire of the lightning arrester with a bolt.

Korean Patent Publication No. 10-1997-0071889 discloses a disconnect switch for disconnecting a high-voltage arrester from ground (hereinafter referred to as "A"). "A" connects and disconnects in the form of a plate between a contact plate and a shaft contact plate. When the flatness is lowered during plate processing and assembly, it is deformed in the form of a point contact, and thus a surge voltage cannot be quickly released to the outside due to the decrease in contact area when a high voltage surge occurs in a transformer, resulting in damage to the transformer. In addition, "A" has a short length of a cylinder that guides the shaft, which causes the shaft to be driven to one side of the inner wall of the cylinder due to the decrease in verticality during shaft movement. Thus, the shaft may be worn out quickly.

In addition, U.S. Pat. No. 5,663,859 discloses a disconnector switch for disconnecting a high-voltage arrester from ground (hereinafter referred to as "B"). In "B", an upper part of the cylinder spring (contact unit) has a hemispherical shape and is in point contact with the shaft contact rod. Thus, a surge voltage cannot be quickly released to the outside due to the decrease in contact area when a high voltage surge occurs in the transformer, resulting in damage to the transformer. In addition, "B" has no parts to minimize the degree of looseness between the cylinder and the shaft, so the shaft is driven to one side of the inner wall of the cylinder due to the decrease in verticality during shaft movement. Thus, the shaft may be worn out quickly.

SUMMARY

The inventive concept of the present invention relates to a multi-contact disconnect switch for a lightning arrester having a multi-contact structure for uniform contact with a contact shaft.

The inventive concept of the present invention relates to a multi-contact disconnect switch for a lightning arrester having improved fixing force and uniform contact structure with a contact shaft through sawtooth-shaped support bodies.

The inventive concept of the present invention relates to a multi-contact disconnect switch for a lightning arrester capable of maintaining a constant distance between a contact shaft and an inner circumferential surface of a first body through a guide unit.

The inventive concepts of the present invention are not limited to the mentioned above, and other inventive concepts not mentioned will be clearly understood by those skilled in the art from the following description.

The inventive concept provides a multi-contact disconnect switch including a first body having a passage formed therein and a multi-contact unit positioned on one side of the passage, and a second body having a contact shaft inserted into the passage and coupled to the other side of the first body, wherein, when the second body is coupled to the first body in a contact state, an end of the contact shaft is in contact with the multi-contact unit, and thus the multi-contact unit is in multi-contact with a contact circumferential surface of the contact shaft.

The multi-contact unit includes an open ring-shaped contact body, and a plurality of support bodies arranged in an outward oblique direction on both sides of the contact body, and supported on a step formed on one side of the passage.

In addition, the contact body includes a plurality of contact pieces arranged at regular intervals in the width direction of the contact body.

In addition, the width of the multi-contact unit is maintained at 5 mm to 50 mm.

In addition, the support bodies are spaced apart at regular intervals and are arranged in a sawtooth shape.

In addition, the width of the first body is maintained at 30 mm to 300 mm.

In addition, at the other side of the passage, a guide unit for maintaining a constant distance between the contact shaft and an inner circumferential surface of the first body is arranged.

In addition, the guide unit includes an open ring-shaped shaft fixing unit, and a plurality of support units arranged in an outward oblique direction on both sides of the shaft fixing unit, and supported on a step formed on the other side of the passage.

In addition, in the shaft fixing unit, a plurality of guide support pieces arranged at regular intervals in the width direction of the shaft fixing unit are formed.

The above aspects of the present invention are only some of the preferred embodiments of the present invention, and various embodiments reflecting the technical features of the present invention may be derived and understood based on the detailed description of the present invention to be described below by those skilled in the art.

The present invention described above has the following effects.

First, when a high voltage surge occurs in a transformer, it can be quickly discharged to the outside by a multi-contact unit which surrounds the entire contact shaft in a circular shape for even contact of all the contact units, thereby overcoming the incomplete contact problems in the prior art.

In addition, by applying a structure in which sawtooth-shaped support bodies are arranged in an outward oblique direction, it is possible to increase the lifespan of the invention because the fixing force between the first body and the contact shaft is increased and the deformation during grounding and disconnection operations is minimized due to the elasticity of the teeth.

In addition, by applying a structure in which individual sawtooth-shaped plates are connected to the support bodies in a circular shape corresponding to the shape of the contact shaft, the contact shaft is not biased to one side and contacts the entire circumferential surface evenly due to the multi-contact structure that moves organically. Thus, it is possible to reduce loss during high current conduction by maintaining contact resistance low caused by the increase in contact force.

In addition, by maintaining the width of the contact body at 5 mm to 50 mm, it is possible to prevent damage to the transformer and damage to the disconnect switch.

In addition, by maintaining the length of the first body at 30 mm to 300 mm, it is possible to reduce wear of the contact shaft.

In addition, by using a guide unit for reducing the case that the contact shaft is biased to one side in the passage when the contact shaft is moved and minimizing the flow of the contact shaft, it is possible to reduce the wear of the contact shaft and increase the operational stability.

The effects of the present invention are not limited to the effects mentioned above, and other effects not mentioned will be clearly understood by those skilled in the art from the description below.

DETAILED DESCRIPTION

Figure 1:
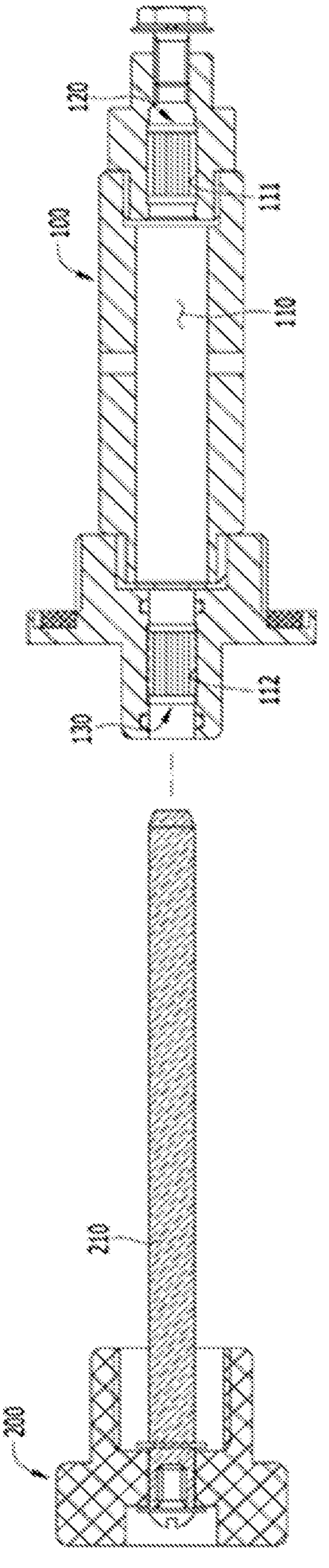
FIG. 1 is an exploded cross-sectional view of a first body and a second body combined with a contact shaft according to an embodiment of a multi-contact disconnect switch for a lightning arrester of the present invention.

Hereinafter, some embodiments of the present invention will be described in detail through exemplary drawings. In adding reference numerals to the components of each drawing, it should be noted that the same components have the same numerals as much as possible even if they are displayed on different drawings. In addition, in describing an embodiment of the present invention, if it is determined that a detailed description of a related known configuration or function hinders understanding of the embodiment of the present invention, the detailed description will be omitted.

In addition, terms such as first, second, A, B, (a), and (b) may be used in describing the components of an embodiment of the present invention. These terms are only used to distinguish the components from other components, and the nature, order, or sequence of the corresponding components is not limited by the terms. When a component is described as being "coupled", "combined" or "connected" to another component, that component may be directly coupled or connected thereto, but other components may be "coupled", "combined" or "connected" between each component.

Figure 2:
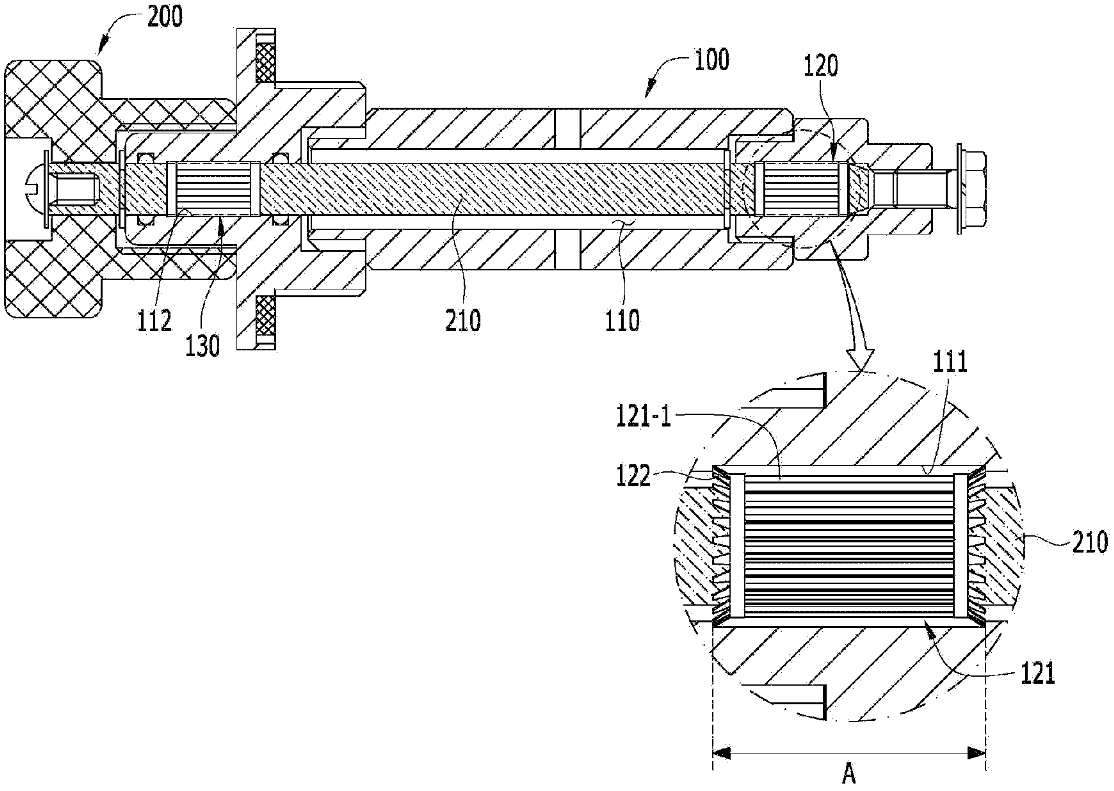
FIG. 2 is a cross-sectional view showing a contact state according to an embodiment of a multi-contact disconnect switch for a lightning arrester of the present invention.
Figure 3:
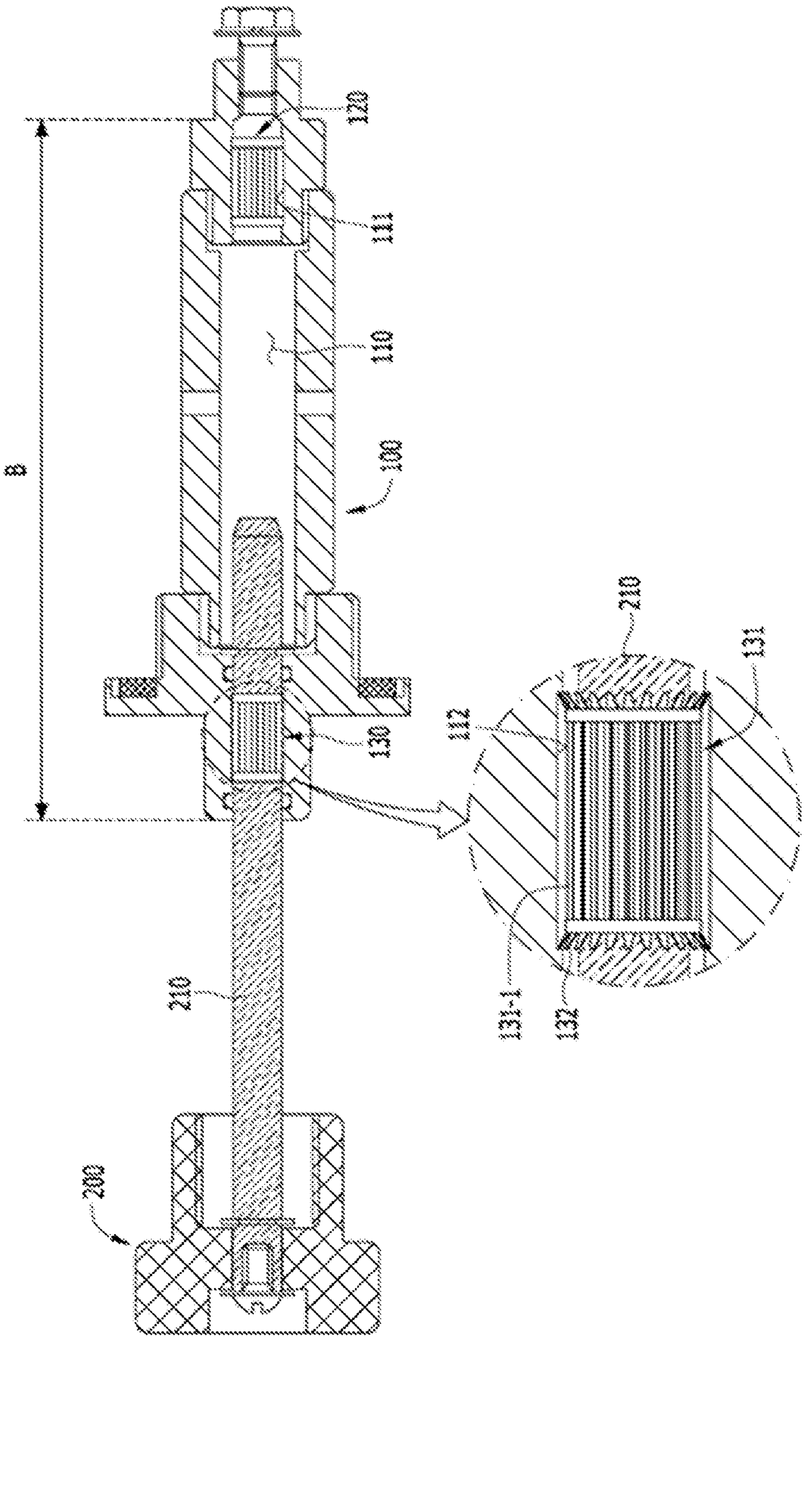
FIG. 3 is a cross-sectional view showing a disconnected state according to an embodiment of a multi-contact disconnect switch for a lightning arrester of the present invention.
Figure 4:
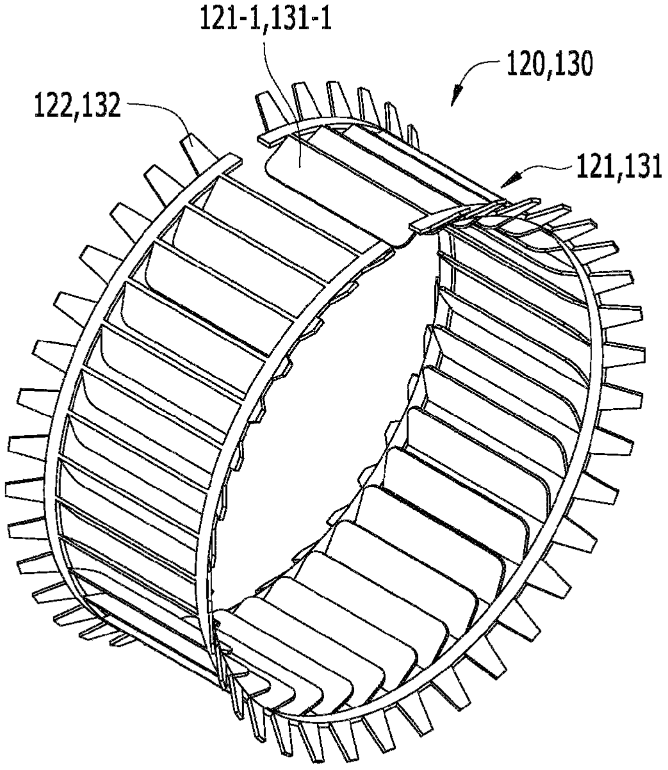
FIG. 4 is a perspective view of a multi-contact unit and a guide unit according to the present invention.

FIG. 1 is an exploded cross-sectional view of a first body and a second body coupled to a contact shaft according to an embodiment of a multi-contact disconnect switch for a lightning arrester of the present invention, FIG. 2 is a cross-sectional view showing a contact state according to an embodiment of a multi-contact disconnect switch for a lightning arrester of the present invention, FIG. 3 is a cross-sectional view showing a disconnected state according to an embodiment of a multi-contact disconnect switch for a lightning arrester of the present invention, and FIG. 4 is a perspective view of a multi-contact unit and a guide unit according to the present invention.

Referring to FIGS. 1 to 4, a multi-contact disconnect switch for a lightning arrester according to the present invention will be described. In addition, since the basic structure and operating state of the disconnector are known technologies, and describing all of them may obscure the gist of the present invention, only the core structure applied to the present invention and parts related thereto will be described in this specification.

The multi-contact disconnect switch for a lightning arrester may include a first body 100, and a second body 200.

First, referring to FIGS. 1 to 3, the right side may be referred to as "one side (unit)" or "one end (unit)", and the left side may be referred to as "the other side (unit)" or "the other end (unit)". In addition, according to their relative positions, the right side may be referred to as "one side (unit)" or "one end (unit)", and the left side may be referred to as "the other side (unit)" or "the other end (unit)".

Basically, the first body 100 as a passage through which the contact shaft 210 to be described later moves may prevent the contact shaft 210 from being separated, and protect the contact shaft 210. The first body 100 may be assembled to an enclosure of a transformer (not shown) and may perform a grounding function. The first body 100 may be connected to a lead wire of a lightning arrester (not shown) and may insulate the contact shaft 210.

The aforementioned passage 110 may be formed in the center of the first body 100 in the longitudinal direction of the first body 100. The passage 110 may have a tubular shape. Steps 111 and 112 may be formed inside one side and the other side of the passage 110. The inner diameters of the steps 111 and 112 may be greater than the inner diameter of the passage 110. A multi-contact unit 120 to be described later may be disposed on the step 111 formed on one side of the passage 110. In addition, a guide unit 130 to be described later may be disposed on the step 112 formed on the other side of the passage 110.

One side of the second body 200 may be coupled to the other side of the first body 100. A hollow may also be formed in the center of the second body 200 in the longitudinal direction of the second body 200. The hollow may be disposed on a straight line with the central axis of the passage 110.

The contact shaft 210 may be fastened to the hollow. The other side of the contact shaft 210 may be fixedly coupled to the hollow by a bolt (reference number not shown) or the like. One side of the contact shaft 210 coupled to the hollow may extend in one direction of the second body 200. As the contact shaft 210 extending in one direction of the second body 200 is inserted into the passage 110 and moves from the other side to one side of the moving passage 110, the second body 200 may be coupled to the first body 100. When the first body 100 is coupled to the second body 200, one side of the contact shaft 210 may be coupled to the multi-contact unit 120. That is, as shown in FIG. 2, while an end of one side of the contact shaft 210 is inserted into the multi-contact unit 120, an inner circumference of the multi-contact unit 120 may be contact-supported on a circumferential surface of one side of the contact shaft 210.

The contact shaft 210 coupled to the second body 200 may connect or disconnect the lightning arrester from ground.

Referring to FIG. 4, the multi-contact unit 120 may include a contact body 121 and support bodies 122.

The contact body 121 may be in an open ring shape. A plurality of contact pieces 121-1 arranged at regular intervals may be formed on the contact body 121. The contact pieces 121-1 may protrude toward the inner center, for example, rounded or inwardly inclined, for line contact rather than surface contact. Therefore, when one end of the contact shaft 210 is inserted into the contact body 121, the contact pieces 121-1 protruding toward the inner center may be contact-supported on the circumferential surface of the one end of the contact shaft 210. Since the contact pieces 121-1 are arranged at regular intervals along the ring-shaped contact body 121, the multi-contact may be made by pressing the circumferential surface of the contact shaft 210 with a uniform pressure.

The plurality of support bodies 122 may be arranged in an outward oblique direction on both sides of the contact body 121, for example, in a sawtooth shape. The support bodies 122 may be arranged in such a way that each tooth is spaced apart at regular intervals. The positions of the sawtooth-shaped support bodies 122 may correspond to the positions of the contact pieces 121-1, respectively. When the positions of the support bodies 122 correspond to those of the contact pieces 121-1, it is possible to secure the elastic force above a certain intensity with respect to the support bodies 122 and the contact support force above a certain pressure with respect to the contact pieces 121-1.

Although multiple support bodies 122 and contact pieces 121-1 are shown in the drawing, the number of the multiple support bodies 122 and contact pieces 121-1 may be, for example, two or three. The number of the support bodies 122 and the contact pieces 121-1 may be set differently depending on the elastic force and contact support force to be secured.

Referring to FIG. 2, the width A of the multi-contact unit 120 may be set to 5 mm to 50 mm. When the width of the multi-contact unit 120 is set to less than 5 mm, damage to the transformer may occur as the time for discharging a surge voltage to the outside increases due to insufficient contact area. In addition, when the width of the multi-contact unit 120 exceeds 50 mm, the disconnection time may increase and the amount of arc generated during the disconnection operation may increase, thereby damaging the disconnect switch.

Additionally, referring to FIG. 3, the length B of the first body 100 may be set to 30 mm to 300 mm. When the length of the first body 100 is set to less than 30 mm, wear of the contact shaft 210 may increase as the interference with the inner circumference of the first body 100 increases due to lowered verticality (horizontality in the drawing) during movement of the contact shaft 210, caused by the lack of guide ability. In addition, even when the length of the first body 100 exceeds 300 mm, wear of the contact shaft 210 may increase as the interference with the inner circumference of the first body 100 increases due to sagging (lowered horizontality) during movement of the contact shaft 210, caused by the increase in the length of the contact shaft 210.

A guide unit 130 may be further disposed on the other side of the first body 100, i.e., inside the other side of the passage 110.

The guide unit 130 may maintain a constant distance between the contact shaft 210 and the inner circumferential surface of the first body 100 while being in contact with the circumference of the other side of the contact shaft 210. That is, the horizontal mobility of the contact shaft 210 may be improved.

The guide unit 130 may include a shaft fixing unit 131 and support units 132.

The shaft fixing unit 131 may also be configured in an open ring shape. A plurality of guide support pieces 131-1 spaced apart at regular intervals may also be formed on the shaft fixing unit 131.

The plurality of support units 132 may also be arranged in an outward oblique direction on both sides of the shaft fixing unit 131, for example, in a sawtooth shape.

In FIG. 4, reference numerals of the multi-contact unit 120 and the guide unit 130 are identically indicated. That is, the guide unit 130 may also be manufactured in the same form as the multi-contact unit 120, and the description of the multi-contact unit 120 described above may be referred to for the structure and characteristics of each of the guide unit 130 and the multi-contact unit 120 in FIG. 4.

However, since the guide support pieces 131-1 are for positioning the contact shaft 210 on the central axis rather than for multi-contact, each of the guide support pieces 131-1 presses the contact shaft 210 with a uniform pressure and places the contact shaft 210 on the central axis of the passage 110.

According to the present invention described above, when a high voltage surge occurs in the transformer, it is possible to discharge the surge voltage to the outside through the multi-contact unit 120. In addition, by applying the structure of sawtooth-shaped support bodies 122, it is possible to increase the fixing force between the first body 100 and the contact shaft 210, and increase the lifespan of the invention by minimizing deformation during the grounding operation as in FIG. 2 and the disconnection operation as in FIG. 3.

In addition, by applying the structure of the above-described sawtooth-shaped support bodies 122, it is possible to reduce loss during high current conduction by maintaining contact resistance low caused by the increase in contact force.

In addition, the configuration of the guide unit 130 may reduce wear of the contact shaft 210 and increase operational stability.

Although all components constituting the embodiments of the present invention have been described above as being combined or operated as one, the present invention is not necessarily limited to these embodiments. That is, within the scope of the object of the present invention, all of the components may be selectively combined with one or more to operate. In addition, since terms such as "include", "comprise" or "have" described above indicate that the corresponding component may be contained therein unless otherwise stated, and thus it should be construed as further including other components rather than excluding other components. All terms, including technical or scientific terms, have the same meaning as commonly understood by those skilled in the art to which the present invention belongs, unless defined otherwise. Commonly used terms, such as terms defined in a dictionary, should be interpreted as consistent with the contextual meaning of the related art, and unless explicitly defined in the present invention, they are not interpreted in an ideal or excessively formal meaning.

The above description is merely an example of the technical idea of the present invention, and various modifications and variations can be made by those skilled in the art without departing from the essential characteristics of the present invention. Therefore, the embodiments disclosed in the present invention are not intended to limit the technical idea of the present invention, but to explain, and the scope of the technical idea of the present invention is not limited by these examples. The protection scope of the present invention should be construed according to the claims below, and all technical ideas within the equivalent range should be construed as being included in the scope of the present invention.

What is claimed is:

1. A multi-contact disconnect switch for a lightning arrester, comprising:

a first body having a passage formed therein and a multi-contact unit positioned on one side of the passage; and a second body having a contact shaft inserted into the passage and coupled to an other side of the first body, wherein, when the second body is coupled to the first body in a contact state, an end of the contact shaft is in contact with the multi-contact unit, and thus the multi-contact unit is in multi-contact with a circumferential contact surface of the contact shaft, wherein the multi-contact unit comprises:

an open ring-shaped contact body, and a plurality of support bodies arranged in an outward oblique direction on both sides of the contact body, and supported on a step formed on the one side of the passage, wherein a plurality of contact pieces arranged at regular intervals are formed in the contact body, wherein each of the plurality of support bodies are spaced apart at regular intervals and arranged in a sawtooth shape, wherein a width of the multi-contact unit is maintained at 5 millimeters (mm) to 50 mm, and a length of the first body is maintained at 30 mm to 300 mm, wherein the width of the multi-contact unit is less than the length of the first body.

2. The multi-contact disconnect switch of claim 1, wherein, in the an other side of the passage, a guide unit for maintaining a constant distance between the contact shaft and an inner circumferential surface of the first body is further arranged.

3. The multi-contact disconnect switch of claim 2, wherein the guide unit comprises:

an open ring-shaped shaft fixing unit; and a plurality of support units arranged in an outward oblique direction on both sides of the shaft fixing unit, and supported on a step formed on the an other side of the passage.

4. The multi-contact disconnect switch of claim 3, wherein, in the shaft fixing unit, a plurality of guide support pieces arranged at regular intervals are formed.

* * * * *